US012789891B2

(12) United States Patent
Lee

(10) Patent No.: US 12,789,891 B2
(45) Date of Patent: Nov. 10, 2026

(54) STEERING CONTROL APPARATUS AND DRIVER MODE CHANGING METHOD THEREOF

(71) Applicant: HL Mando Corporation, Pyeongtaek-si (KR)

(72) Inventor: Jaewoo Lee, Gwangju-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 372 days.

(21) Appl. No.: 18/405,010

(22) Filed: Jan. 5, 2024

(65) Prior Publication Data

US 2025/0136177 A1 May 1, 2025

(30) Foreign Application Priority Data

Oct. 31, 2023 (KR) ........................ 10-2023-0147633

(51) Int. Cl.
*B62D 6/00* (2006.01)
*B62D 5/00* (2006.01)

(52) U.S. Cl.
CPC ............. *B62D 6/008* (2013.01); *B62D 5/006* (2013.01)

(58) Field of Classification Search
CPC ........ B62D 6/008; B62D 5/006; B62D 6/007; B62D 5/046; B62D 6/10; B62D 15/0225
See application file for complete search history.

(56) References Cited

U.S. PATENT DOCUMENTS

2019/0367084 A1* 12/2019 Hong .................... B62D 6/008

* cited by examiner

*Primary Examiner* — Grant Moubry
*Assistant Examiner* — Ruben Picon-Feliciano
(74) *Attorney, Agent, or Firm* — Hauptman Ham, LLP

(57) ABSTRACT

According to an embodiment of the present disclosure, a steering control apparatus of a steer by wire (SbW) system including a steer wheel feedback actuator (SFA) and a road wheel actuator (RWA) includes a communicator configured to receive a driver mode change command, information on a rack position of the RWA, and information on a torsion bar torque of the SFA, a determiner configured to determine whether to change a driver mode based on the driver mode change command and the information on the rack position and to generate a driver mode change signal based on the determined result, and a controller configured to control output torque for the SFA based on the driver mode change signal, information on a current torsion bar torque, and information on a target torsion bar torque of a target driver mode.

11 Claims, 10 Drawing Sheets

STEERING CONTROL APPARATUS AND DRIVER MODE CHANGING METHOD THEREOF

CROSS-REFERENCE TO RELATED APPLICATION

This application claims priority under 35 U.S.C. § 119 to Korean Patent Application No. 10-2023-0147633, filed on Oct. 31, 2023, in the Korean Intellectual Property Office (KIPO), the disclosure of which is incorporated by reference herein in its entirety.

TECHNICAL FIELD

The present disclosure relates to a steering control apparatus of a vehicle to which a steer by wire (SbW) system is applied, and a method of changing a driver mode using the steering control apparatus.

BACKGROUND

In general, when a driver changes a drive mode in a vehicle equipped with an electric power steering (EPS) system, the driver mode is changed when torque applied to a torsion bar of a steering wheel passes through 0 Nm. This is to minimize a change felt by the driver. However, unlike a general-purpose steering system such as the EPS, a steer by wire (SbW) system is configured so that a steer wheel feedback actuator (SFA) and a road wheel actuator (RWA) are not mechanically connected to each other. Therefore, in order to minimize a change in steering feel and noise when a driver mode is changed in a vehicle equipped with the SbW system, it is necessary to transition the driver mode under different conditions than when the drive mode is changed in a vehicle equipped with the general-purpose steering system.

For example, when a driver mode is changed from a comfort mode to a sports mode in the vehicle equipped with the SbW system, a target motor torque rapidly increases at the time when the mode starts to change due to a torque value difference between a torque command for the comfort mode and a torque command for the sports mode as shown in FIG. 1. Therefore, torque that is output by a motor of the SFA also rapidly increases, thus causing noise and a change in steering feel.

Further, since a variable gear ratio (VGR) is generally applied to the SbW system, a target rack position may change if the driver mode is changed when the torsion bar torque becomes 0 Nm like a general-purpose steering system. This affects vehicle behavior by creating steering that is different from a driver's intention.

Therefore, there is a need for a method that can smoothly transition a driver mode even in the vehicle equipped with the SbW system and can create steering matching a driver's intention.

SUMMARY

In view of the above, the present disclosure provides a steering control apparatus and a driver mode changing method thereof that can smoothly transition a drive mode in a vehicle to which a SbW system is applied.

Further, the present disclosure provides a steering control apparatus and a driver mode changing method thereof that can control steering according to a driver's intention when changing a driver mode in a vehicle to which a SbW system is applied.

Technical objects to be achieved by the present disclosure are not limited to those described above, and other technical objects not mentioned above may also be clearly understood from the descriptions given below by those skilled in the art to which the present disclosure belongs.

According to embodiments of the present disclosure, a steering control apparatus of a steer by wire (SbW) system having a steer wheel feedback actuator (SFA) and a road wheel actuator (RWA) may include a communicator configured to receive a driver mode change command, information on a rack position of the RWA, and information on a torsion bar torque of the SFA, and a controller configured to determine whether to change a driver mode based on the driver mode change command and the information on the rack position, and to control output torque for the SFA using a driver mode change signal generated based on the determined result, information on a current torsion bar torque, and information on a target torsion bar torque of a target driver mode.

The controller may compare the driver mode indicated by the driver mode change command with a current driver mode to determine validity of the driver mode change command, and determine whether the rack position is in a driver mode changeable position based on that the driver mode change command is valid, and the driver mode change signal may represent to change to the driver mode based on that the rack position is in the driver mode changeable position.

The driver mode change signal may represent to change to the drive mode based on that a product between a current rack position and a previous rack position is less than 0.

Based on that the driver mode change signal represents to change to the drive mode, the controller may derive a rate limit value for the target torsion bar torque, and control a change rate of the output torque based on the rate limit value.

Based on that the driver mode change signal represents to change to the drive mode, the controller may reset an initial value of the target torsion bar torque.

The controller resets a value of the current torsion bar torque to the initial value of the target torsion bar torque.

The controller may control to limit a change rate of the output torque based on that a difference value between the target torsion bar torque and a final target torsion bar torque is greater than a threshold value, and may control the current torsion bar torque to follow the target torsion bar torque based on that the difference value between the target torsion bar torque and the final target torsion bar torque is equal to or less than the threshold value, and the final target torsion bar torque may be derived based on the rate limit value.

According to embodiments of the present disclosure, a method of changing a driver mode using a steering control apparatus in a steer by wire (SbW) system comprising a steer wheel feedback actuator (SFA) and a road wheel actuator (RWA) may include receiving a driver mode change command, information on a rack position of the RWA, and information on a torsion bar torque of the SFA, generating a driver mode change signal based on the driver mode change command and the information on the rack position, and controlling output torque for the SFA based on the driver mode change signal, information on a current torsion bar torque, and information on a target torsion bar torque of a target driver mode.

According to embodiments of the present disclosure, a computer program stored in a computer-readable recording medium, when executed by a processor, may include instructions to cause the processor to perform a driver mode changing method including generating a driver mode change signal based on a driver mode change command input by a driver and information on a rack position of a steer by wire (SbW) system, and generating a control signal for controlling output torque for a steer wheel feedback actuator (SFA) of the SbW system based on the driver mode change signal, information on a current torsion bar torque of the SbW system, and information on a target torsion bar torque of a target driver mode.

According to an embodiment of the present disclosure, since a change rate of a torsion bar torque is limited when changing a driver mode in a vehicle equipped with a SbW system, the driver mode can be smoothly transitioned.

According to an embodiment of the present disclosure, since a driver mode is transitioned when a rack position passes through 0 mm upon changing the driver mode in a vehicle equipped with a SbW system, steering can be controlled according to a driver's intention.

DETAILED DESCRIPTION

Figure 1:
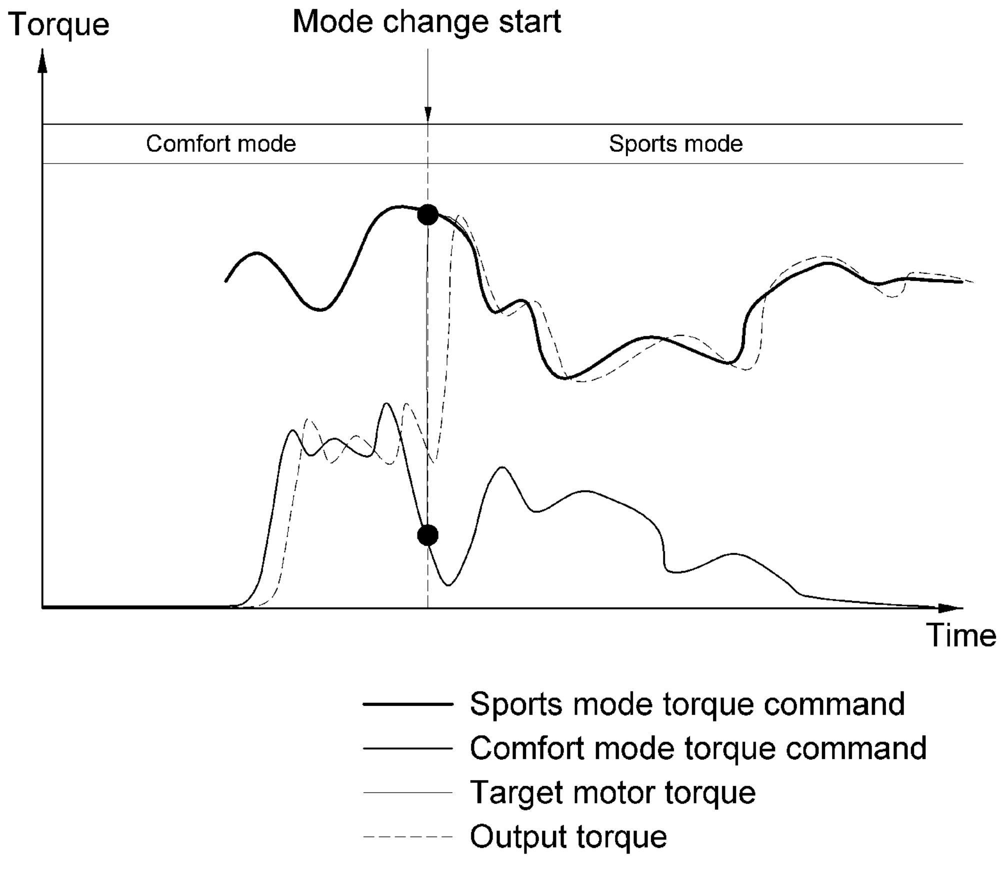
FIG. 1 is a diagram illustrating an output torque when changing a driver mode using a conventional driver mode changing method in a vehicle equipped with a SbW system.

The advantages and features of the present disclosure, and a method for achieving them will be clearly understood with reference to the embodiments described in detail together with appended drawings. However, the present disclosure is not limited to the embodiments disclosed below but may be implemented in various other forms; rather, the present embodiments are provided to make the present disclosure complete and inform those skilled in the art clearly of the technical scope of the present disclosure, and the present disclosure may be defined within the technical scope of the appended claims. Thus, in some embodiments, well-known processing steps, structures, and techniques have not been described in detail to avoid obscuring the interpretation of the present disclosure.

The terms used in the present disclosure have been selected from commonly used and widely accepted terms that best describe the functions of the present disclosure; however, it should be noted that the selection of terms may vary depending on the intention of those persons skilled in the corresponding field, precedents, or emergence of new technologies. Also, in a particular case, some terms may be selected arbitrarily by the applicant, and in this case, detailed definitions of the terms will be provided in the corresponding description of the present disclosure. Therefore, the terms used in the present disclosure should be defined not simply by their apparent name but based on their meaning and context throughout the present disclosure.

Throughout the document, unless otherwise explicitly stated, if a particular element is said to "include" some particular element, it means that the former may further include other particular elements rather than exclude them.

In this specification, components of a steering control apparatus may refer to software or hardware components such as a field programmable gate array (FPGA) or an application specific integrated circuit (ASIC), and perform at least one function or operation. However, the above components are not limited to software or hardware. The components may be configured to be in an addressable storage medium and to run one or more processors. Therefore, as an example, the components may include components such as software components, object-oriented software components, class components and task components, processes, functions, properties, procedures, subroutines, segments of program code, drivers, firmware, microcode, circuits, data, databases, data structures, tables, arrays, and variables. The functions provided by the components of the present disclosure may be combined into a smaller number of components or may be further separated into additional components.

Also, the terms such as first, second, and third are introduced to describe various constituting elements, but the constituting elements should not be limited by the terms. The terms are used only for the purpose of distinguishing one from the other constituting elements.

In what follows, embodiments of the present disclosure will be described in detail with reference to appended drawings so that those skilled in the art to which the present disclosure belongs may readily apply the present disclosure. Moreover, to describe the present disclosure without ambiguity, those parts not related to the description of the present disclosure have been omitted. Throughout the document, the same reference symbols refer to the same constituting elements.

Figure 2:
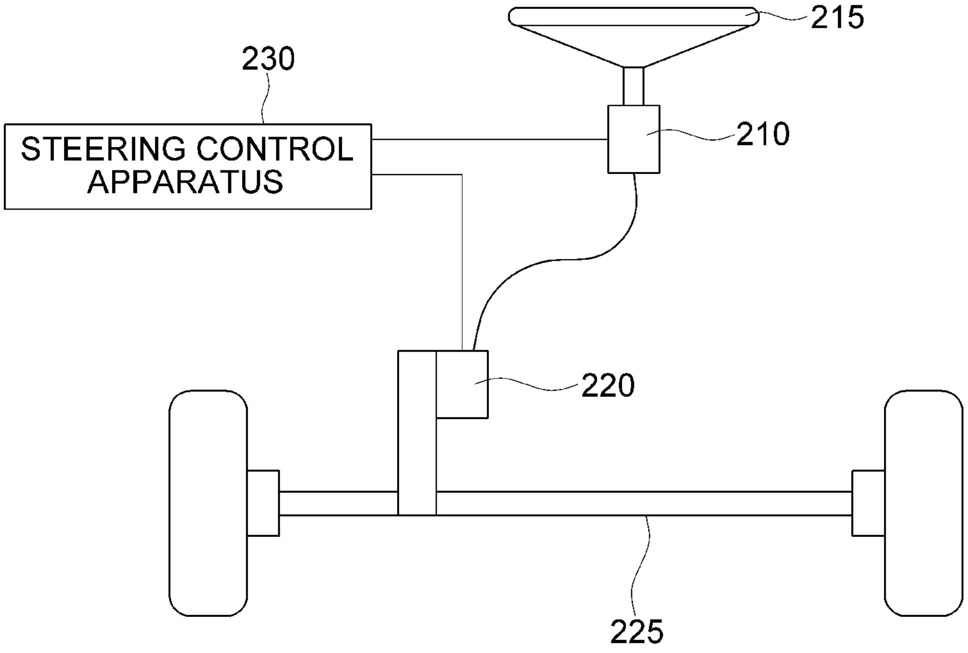
FIG. 2 is a diagram illustrating a SbW system according to an embodiment of the present disclosure.

FIG. 2 is a diagram illustrating a SbW system according to an embodiment of the present disclosure.

Referring to FIG. 2, the SbW system may include a SFA 210, a RWA 220, and a steering control apparatus 230.

The SFA 210 may be configured to generate a reaction in a direction opposite to the rotating direction of a steering wheel 215. To this end, for instance, the SFA 210 may include an electric motor. The electric motor may be referred to as a reaction motor. Torque generated by the electric motor may be provided or applied to a torsion bar provided on a steering shaft of the steering wheel 215. A torque sensor may be provided on a side of the steering shaft to measure torque applied to the torsion bar. A torque value (information on torsion bar torque) measured by the torque sensor may be transmitted to a steering control apparatus 130 through a controller area network (CAN) bus.

The RWA 220 is not mechanically connected to the SFA 210 but may be connected by a wire. The RWA 220 may be configured to move a rack 225 to a position corresponding to the steering angle of the SFA 210. To this end, for example, the RWA 220 may include a pinion motor, and a position sensor may be provided on a side of the rack 225 to measure the position of the rack 225. A position value (information on the rack position) measured by the position sensor may be transmitted to the steering control apparatus 230.

The steering control apparatus 230 may control the steering of the vehicle to which the SbW system is applied, using the SFA 210 and the RAW 220. For example, the steering control apparatus 230 may control the driving of the SFA 210 and/or the RAW 220 using information on the steering angle of the steering wheel 215, the torsion bar torque, the rack position, etc., based on a preset driver mode among a plurality of driver modes (or driving mode). Further, when a driver mode change command is input from a driver, the steering control apparatus 230 may change the driver mode of the corresponding vehicle.

Figure 3:
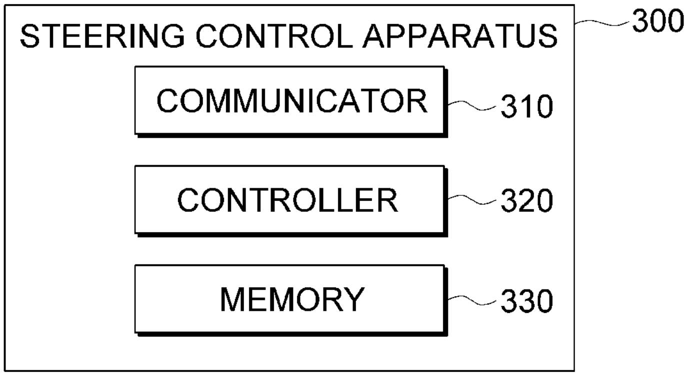
FIG. 3 is a diagram illustrating a steering control apparatus according to an embodiment of the present disclosure.

FIG. 3 is a diagram illustrating a steering control apparatus according to an embodiment of the present disclosure.

Referring to FIG. 3, the steering control apparatus 300 may include a communicator 310, a controller 320, and a memory 330. The steering control apparatus 300 may be implemented with at least one electronic control unit (ECU).

The communicator 310 may be configured to communicate with other electronic control devices, sensors, etc. in the vehicle through the CAN. The communicator 310 may be called various terms such as a communication interface or a transceiver. The communicator 310 may receive a driver mode change command that is input by a driver, information on the rack position measured by the position sensor that is provided on a RWA side, information on the torsion bar torque measured by the torque sensor that is provided on a SFA side, etc. Further, the communicator 310 may transmit a control signal (or control command) generated by the controller 320 to the SFA and/or RWA.

The controller 320 may determine whether to change the driver mode based on the driver mode change command received from the communicator 310 and information on the rack position, and generate a driver mode change signal representing whether to change the driver mode based on the determined result. The controller 320 may be implemented as a semiconductor device or a micro controller unit (MCU) that executes an instruction stored in the memory 330.

For instance, the controller 320 may compare the driver mode indicated by the driver mode change command with the current driver mode of the vehicle to determine the validity of the corresponding driver mode change command. When the current driver mode is the same as the driver mode indicated by the driver mode change command, the controller 320 may determine that the corresponding driver mode change command is invalid. Further, when driver mode change commands indicating different driver modes are input within a certain period of time, the controller 320 may determine that the corresponding driver mode change commands are invalid.

When a valid driver mode change command is input, the controller 320 may determine whether the current rack position is in a driver mode changeable position. Further, the controller 320 may generate a driver mode change signal based on the determined result. For example, when the current rack position is in the driver mode changeable position, the controller 320 may generate the driver mode change signal representing that the current driver mode will be changed to the driver mode indicated by the driver mode change command. However, when the current rack position is not in the driver mode changeable position, the controller 320 may generate the driver mode change signal representing to maintain the current driver mode without changing the driver mode. Here, whether the current rack position is in the driver mode changeable position may be determined based on whether the current rack position passes through the center (e.g. 0 mm) of a rack bar and/or whether the current rack position is adjacent to the center of the rack bar. For instance, this may be determined based on the fact that a product between the current rack position and a previous rack position is less than 0. In this case, when the product between the current rack position and the previous rack position is less than 0, the driver mode change signal may represent to change to the driver mode. When the product between the current rack position and the previous rack position is more than 0, the driver mode change signal may represent to maintain the current driver mode.

On the other hand, the controller 320 may control output torque for the SFA, based on the driver mode change signal, information on the current torsion bar torque, and information on target torsion bar torque of the target driver mode. If the driver mode change signal represents to change to the corresponding driver mode (target driver mode), the controller 320 may derive a rate limit value for the target torsion bar torque of the corresponding driver mode, and may control the change rate of the output torque using a final target torsion bar torque value calculated based on the rate limit value. Here, the rate limit value may be calculated by a preset rate limiting algorithm.

Further, when the driver mode change signal represents that the driver mode will be changed, the controller 320 may reset the initial value of the target torsion bar torque to the value (torque value measured by the current torsion bar) of the current torsion bar torque. Further, the controller 320 compares a difference value between the target torsion bar torque and a final target torsion bar torque derived based on the rate limit value. When the difference value is greater than a preset threshold value, the controller may control to limit the change rate of the output torque by adjusting the rate limit value. That is, the torque that is output from the motor of the SFA may be limited depending on the rate limit value. However, when the difference value between the target torsion bar torque and the final target torsion bar torque is equal to or less than the threshold value, the controller 320 may control the current torsion bar torque to follow the target torsion bar torque by adjusting the rate limit value.

The memory 330 may store information on the rack position and information on the torsion bar torque, received from the communicator 310, and may provide the corresponding information upon request from the controller 320. The memory 330 may include various types of volatile and/or non-volatile storage media. For example, the memory may be implemented as a read only memory (ROM), a random access memory (RAM), etc.

Figure 4:
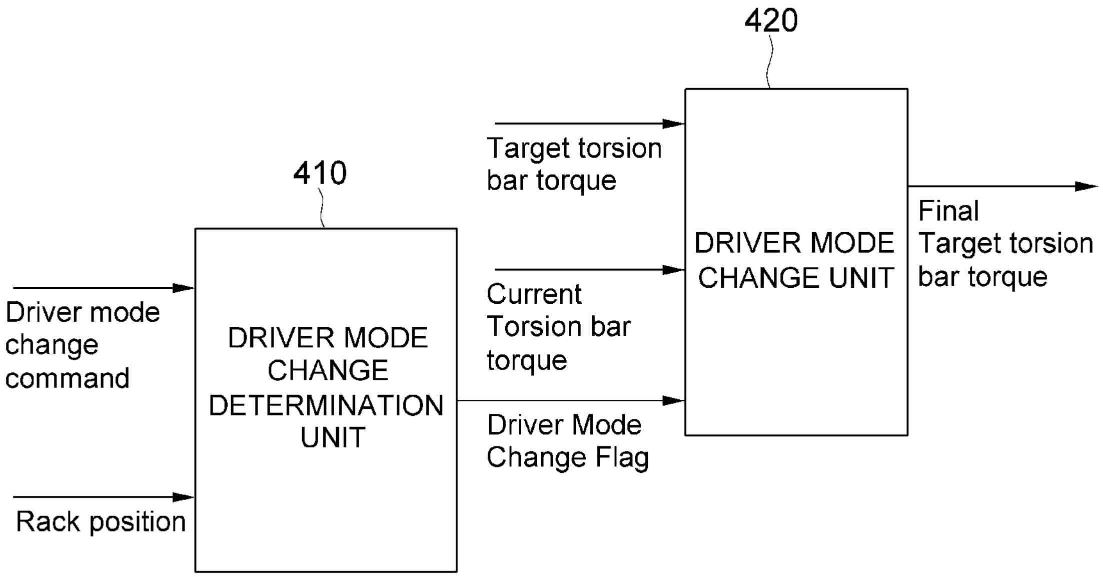
FIG. 4 is a diagram illustrating parameters used when changing a driver mode according to an embodiment of the present disclosure.

FIG. 4 is a diagram illustrating parameters used when the steering control apparatus changes the driver mode according to an embodiment of the present disclosure.

Referring to FIG. 4, the controller of the steering control apparatus may include a driver mode change determination unit 410 and a driver mode change unit 420.

When determining whether to change the driver mode, the driver mode change determination unit 410 may use a driver mode change command input from a driver and information on the rack position measured by the position sensor provided in the rack of the RWA. The driver mode change determination unit 410 may determine the validity of the driver mode change command, and may generate a driver mode change flag based on the current rack position, if the command is valid. Here, the driver mode change flag may include 1 bit of information. For instance, when the value of the driver mode change flag is 1 (true), this may represent that the current driver mode is changed to the driver mode indicated by the driver mode change command. When the value of the driver mode change flag is 0 (false), this may represent that the driver mode is not changed.

The driver mode change unit 420 may receive the driver mode change flag generated by the driver mode change determination unit 410, information on the target torsion bar torque of the corresponding driver mode, and information on the current torsion bar torque, calculate the rate limit value for the target torsion bar torque, and generate information on the final target torsion bar torque based on the rate limit value.

Figure 5:
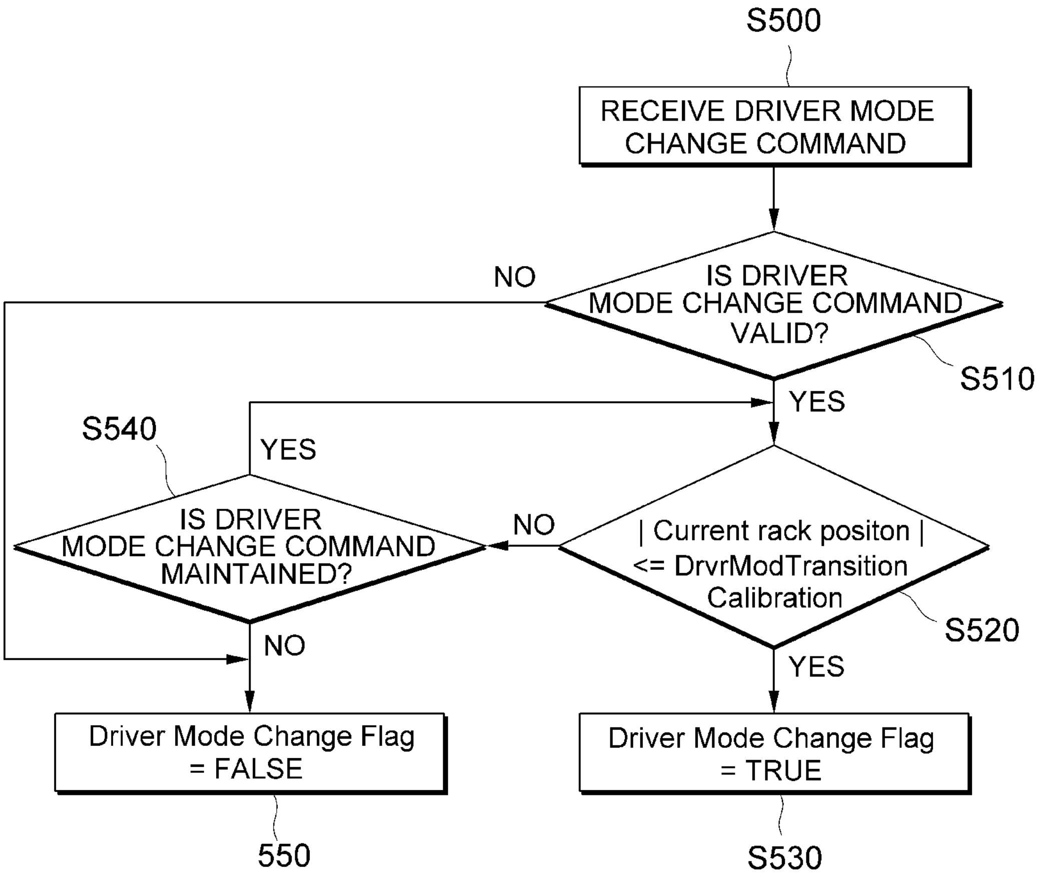
FIG. 5 is a diagram illustrating a process of determining whether to change a driver mode using a steering control apparatus according to an embodiment of the present disclosure.

FIG. 5 is a diagram illustrating a process of determining whether to change the driver mode using the steering control apparatus according to an embodiment of the present disclosure.

Referring to FIG. 5, when the steering control apparatus according to an embodiment of the present disclosure receives the driver mode change command (S500), the driver mode indicated by the corresponding driver mode change command may be compared with the current driver mode to determine the validity of the corresponding driver mode change command (S510). When the driver mode change command is valid, the steering control apparatus may further determine whether the steering of the current vehicle changes rapidly. This may be determined, for example, by comparing a force applied to the rack bar (rack force) and/or a speed at which the rack bar moves (rack speed) with a threshold value. For example, even if the steering control apparatus determines that the driver mode change is valid, the changing of the driver mode may be deferred when the rack force and/or the rack speed of the current vehicle changes rapidly.

When the driver mode change command is valid and the rack force and/or the rack speed is equal to or less than the threshold value, the steering control apparatus may determine whether the current rack position is in the driver mode changeable position (DrvrModTransition Calibration) (S520). To this end, the steering control apparatus may check whether the current rack position passes through the center (e.g. 0 mm) of the rack bar and/or whether the current rack position is adjacent to the center of the rack bar. Whether the current rack position passes through the center of the rack bar may be determined based on whether the product between the current rack position value and the previous rack position value has a negative value.

If the current rack position is in the driver mode changeable position, the steering control apparatus may set the value of the driver mode change flag to 1 (true) (S530). That is, the steering control apparatus may generate the driver mode change flag having the value of 1. However, when the current rack position does not correspond to the driver mode changeable position, the steering control apparatus may determine whether the driver mode change command is maintained (S540). The steering control apparatus may re-determine whether the current rack position is in the driver mode changeable position when the driver mode change command is maintained.

When an invalid driver mode change is input or the driver mode change command is not maintained, the steering control apparatus may set the value of the driver mode change flag to 0 (false) (S550). That is, the steering control apparatus may generate the driver mode change flag having the value of 0.

Figure 6:
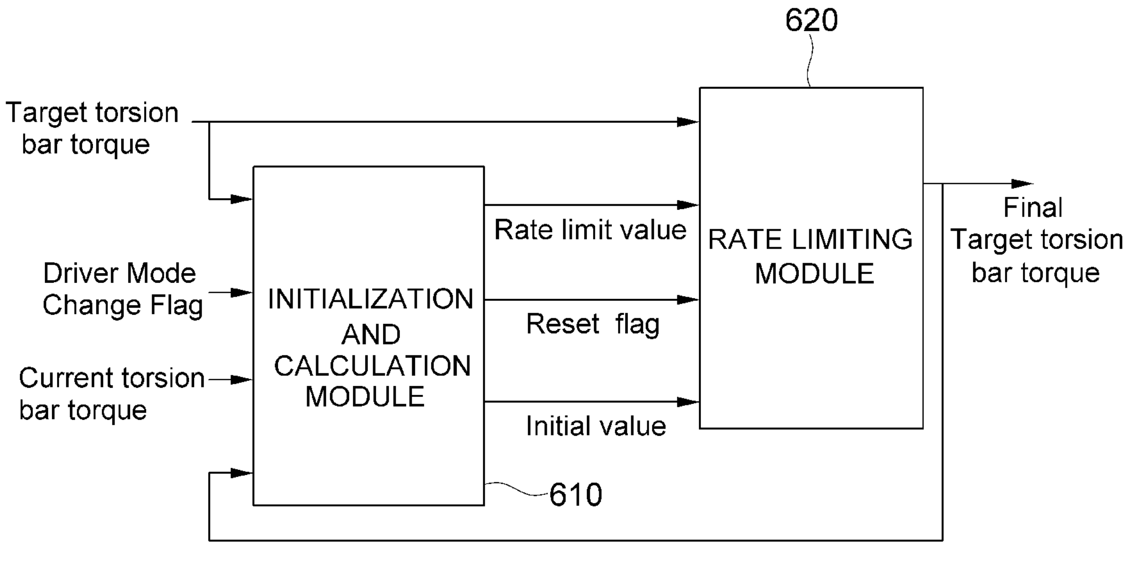
FIG. 6 is a diagram illustrating parameters used when controlling an output torque according to an embodiment of the present disclosure.

FIG. 6 is a diagram illustrating parameters used when controlling an output torque according to an embodiment of the present disclosure.

Referring to FIG. 6, the driver mode change unit of the steering control apparatus may include an initialization and calculation module 610 and a rate limiting module 620.

The initialization and calculation module 610 may receive a driver mode change flag, information on the target torsion bar torque of the corresponding driver mode, and information on the current torsion bar torque, and then generate a rate limit value for the target torsion bar torque, an initial value for the target torsion bar torque, and a reset flag. Here, the information on the target torsion bar torque may be preset for each driver mode, and may be stored in the memory. The rate limit value may be derived through a preset rate limiting algorithm. The reset flag may include 1 bit of information representing whether to reset the initial value. For instance, when the value of the reset flag is 1 (true), this may represent that the initial value is reset. When the value of the reset flag is 0 (false), this may represent that the initial value is not reset. That is, when the value of the reset flag is 0 (false), this may represent that a previously set initial value is maintained.

For example, when the value of the driver mode change flag is 1 (true), the initialization and calculation module 610 may set the value of the reset flag to 1 (true). After the initial value is set to the current torque value of the torsion bar, the rate limit value for the target torsion bar torque may be calculated. However, when the value of the driver mode change flag is 0 (false), the initialization and calculation module 610 may set the value of the reset flag to 0 (false), and may not calculate the rate limit value for the target torsion bar torque. That is, the calculation of the rate limit value for the target torsion bar torque may be omitted.

The rate limiting module 620 may derive a final target torsion bar torque based on the information on the target torsion bar torque, the rate limit value, the reset flag, and/or the initial value, which are input from the initialization and calculation module 610.

Figure 7:
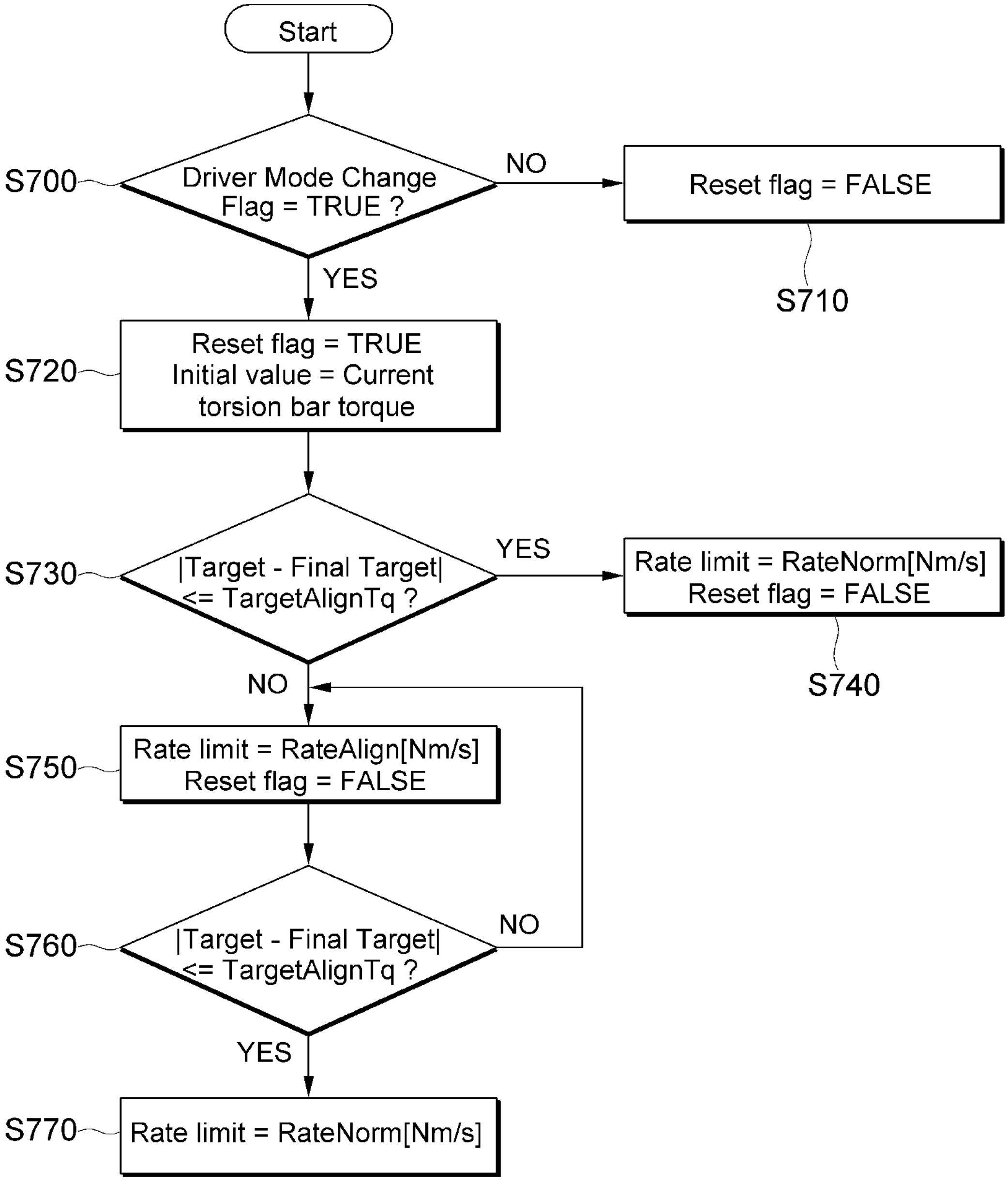
FIG. 7 is a diagram illustrating a process of controlling the output torque using the steering control apparatus according to an embodiment of the present disclosure.

FIG. 7 is a diagram illustrating a process of controlling the output torque using the steering control apparatus according to an embodiment of the present disclosure.

Referring to FIG. 7, the steering control apparatus according to an embodiment of the present disclosure may check the value of the driver mode change flag and determine whether to change the driver mode (S700). When the value of the driver change flag is 0 (false), the steering control apparatus may set the value of the reset flag to 0 (false) (S710), and maintain the current driver mode. That is, when the value of the driver change flag is 0 (false), information on the final target torsion bar torque that is output from the steering control apparatus may not be changed.

However, when the value of the driver change flag is 1 (true), the steering control apparatus may set the value of the reset flag to 1 (true), and set the value of the current torsion bar torque to the initial value (S720). Subsequently, the steering control apparatus may compare the target torsion bar torque value and the final target torsion bar torque value with a preset threshold value (TargetAlignTq) (S730). When a difference value between the target torsion bar torque value and the final target torsion bar torque value is equal to or less than the threshold value, namely, when a difference between the target torsion bar torque value and the final target torsion bar torque value is little, the steering control apparatus may set the rate limit value to a normal rate, and set the value of the reset flag to 0 (false) (S740). In this case, the target torsion bar torque and the final target torsion bar torque may have the same value. However, when the difference value between the target torsion bar torque value and the final target torsion bar torque value is greater than the threshold value, the steering control apparatus may align the rate limit value, and set the value of the reset flag to 0 (false) (S750).

Subsequently, the steering control apparatus re-determines the difference value between the target torsion bar torque value and the final target torsion bar torque value (S760). When the difference value is less than the threshold value, the rate limit value may be normalized (S770). The steering control apparatus may generate a torque control command based on the final target torsion bar torque value, and then provide the torque control command to the SFA.

Figure 8:
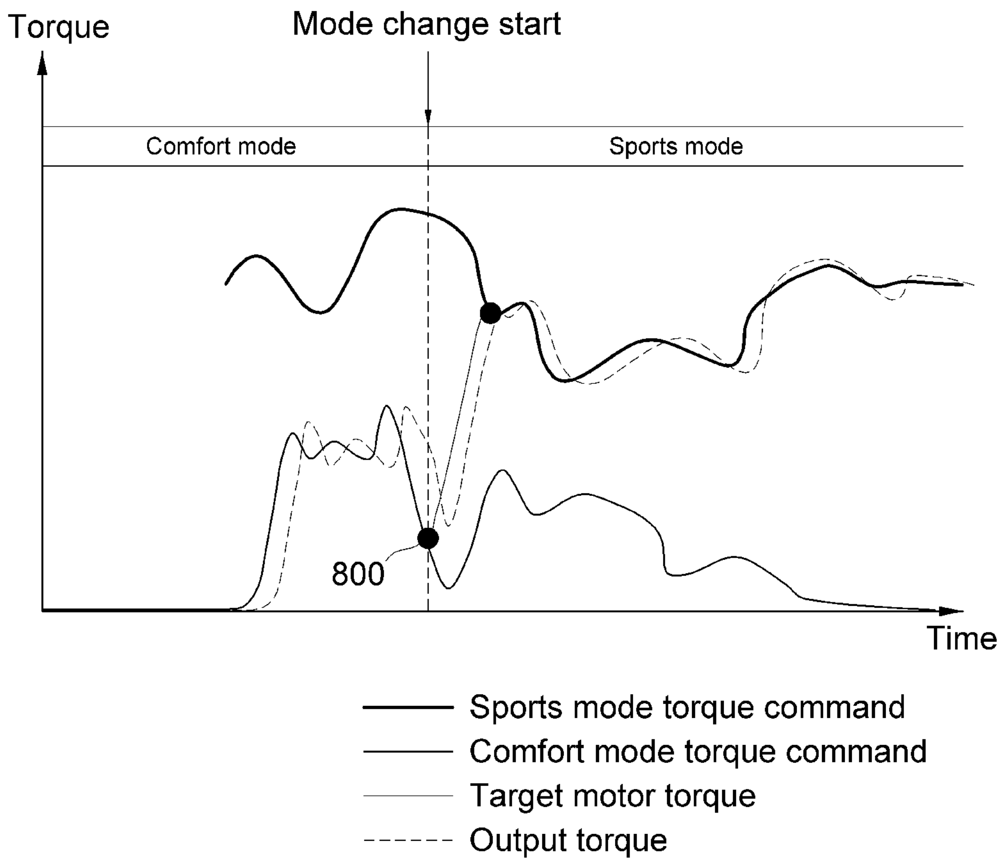
FIG. 8 is a diagram illustrating an output torque when changing a driver mode according to an embodiment of the present disclosure.
Figure 9:
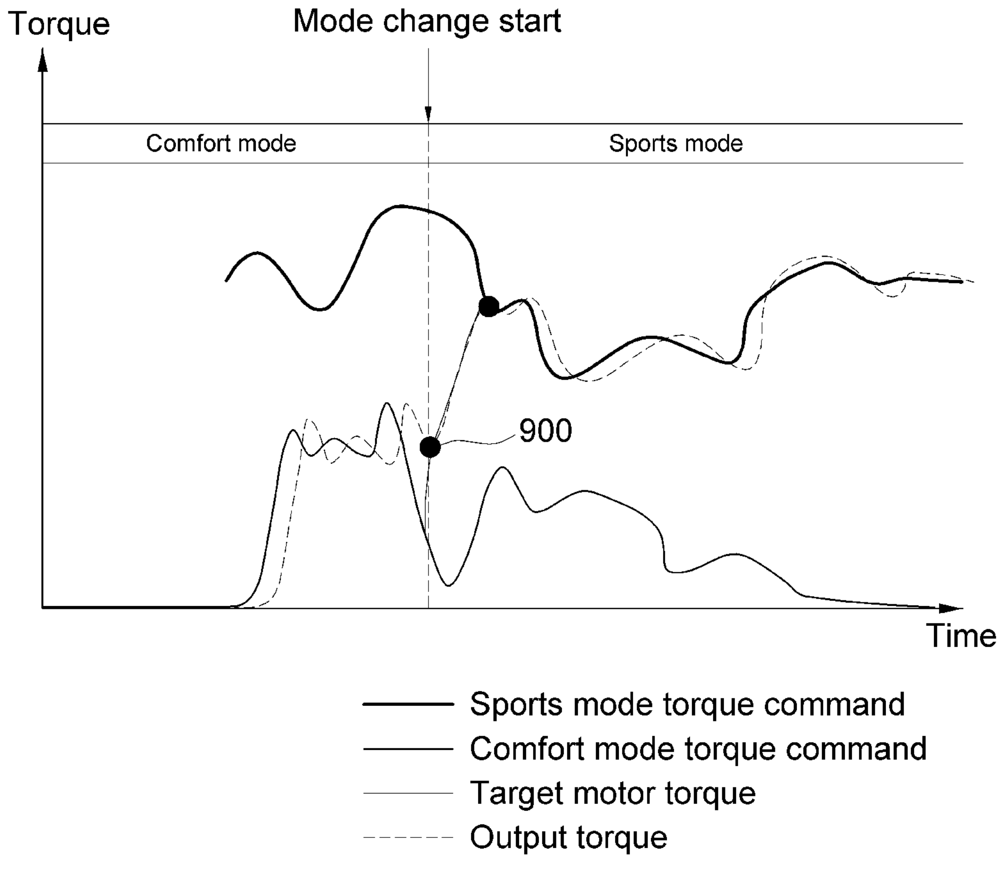
FIG. 9 is a diagram illustrating an output torque when changing a driver mode according to another embodiment of the present disclosure.

FIG. 8 is a diagram illustrating an output torque when changing a driver mode according to an embodiment of the present disclosure, and FIG. 9 is a diagram illustrating an output torque when changing a driver mode according to another embodiment of the present disclosure.

FIGS. 8 and 9 show, as an example, a case where the driver mode is changed from a comfort mode to a sports mode. First, referring to FIG. 8, at the time when the driver mode is changed, there is a significant difference between a torque value indicated by the torque command in the comfort mode and a torque value indicated by the torque command in the sports mode. Thus, if the steering control apparatus controls the output torque according to the torsion bar torque value (target torsion bar torque) in the sports mode when the driver mode is changed, the torque output from the motor of the SFA increases rapidly as shown in FIG. 1, and thus noise occurs and a steering feel is changed. Therefore, according to an embodiment of the present disclosure, as shown in FIG. 8, the output torque of the SFA motor may be controlled to slowly follow the target torsion bar torque value, by calculating the final target torsion bar torque based on the rate limit value when changing the driver mode.

On the other hand, if the torsion bar torque value 800 in the comfort mode is used as the initial value of the final target torsion bar torque as shown in FIG. 8 when changing the driver mode, the output torque (torque applied to the torsion bar) at the time when the driver mode is changed may drop sharply according to the torque command in the comfort mode. Therefore, according to an embodiment of the present disclosure, the output torque 900 at the time when the driver mode is changed as shown in FIG. 9 may be set as an initial value for the final target torsion bar torque. In this case, because the slope of the output torque becomes gentler, a smoother driver mode transition is possible.

Figure 10:
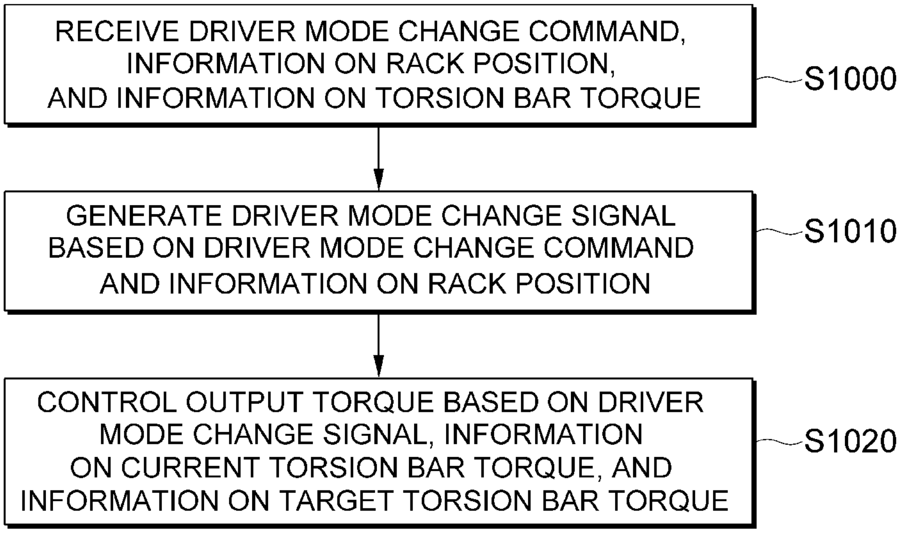
FIG. 10 is a diagram illustrating a method of changing a driver mode using the steering control apparatus according to an embodiment of the present disclosure.

FIG. 10 is a diagram illustrating a method of changing a driver mode using the steering control apparatus according to an embodiment of the present disclosure.

Referring to FIG. 10, the steering control apparatus according to an embodiment of the present disclosure may receive a driver mode change command, information on the rack position of the RWA, information on the torsion bar torque of the SFA, etc. from other electronic control devices, sensors, etc. in the vehicle through the CAN (S1000).

When the steering control apparatus receives the driver mode change command, the apparatus may determine whether to change the driver mode based on the corresponding driver mode change command and information on the rack position, and generate the driver mode change signal representing whether the driver mode is changed based on the determined result (S1010).

For example, the steering control apparatus may compare the driver mode indicated by the corresponding driver mode change command with the current driver mode. If the current driver mode and the driver mode indicated by the driver mode change command are the same, or driver mode change commands indicating different driver modes are input within a certain period of time, the steering control apparatus may determine that the corresponding driver mode change commands are invalid. When the valid driver mode change command is input, the steering control apparatus may determine whether the current rack position is in the driver mode changeable position (e.g. center of the rack bar). When the current rack position is in the driver mode changeable position, the steering control apparatus may generate the driver mode change signal representing to change the current driver mode to the driver mode indicated by the driver mode change command. However, when the current rack position is not in the driver mode changeable position, the steering control apparatus may generate the driver mode change signal representing to maintain the current driver mode without changing the driver mode.

On the other hand, the steering control apparatus may control the output torque for the SFA based on the driver mode change signal, information on the current torsion bar torque, and information on the target torsion bar torque of the target driver mode (S1020).

For example, when the driver mode changes as the driver mode change signal represents the change in driver mode, the steering control apparatus may derive the rate limit value for the target torsion bar torque, and may generate information on the final target torsion bar torque based on the rate limit value. Further, a torque control command may be generated based on information on the final target torsion bar torque, and then may be transmitted to the SFA so that the change rate of the output torque is limited. At this time, the steering control apparatus may reset the initial value of the target torsion bar torque to the torque value applied to the current torsion bar. Further, the steering control apparatus compares the difference value between the target torsion bar torque and the final target torsion bar torque. When the difference value is greater than the threshold value, the steering control apparatus may calculate the rate limit value to adjust the output torque. Subsequently, when the difference value between the target torsion bar torque and the final target torsion bar torque becomes equal to or less than the threshold value, the steering control apparatus may control the current torsion bar torque to follow the target torsion bar torque.

Respective steps included in the driver mode change method performed by the steering control apparatus according to the above-described embodiment may be implemented as a computer program including instructions for causing a processor to perform these steps.

Further, respective steps included in the driver mode change method performed by the steering control apparatus according to the above-described embodiment may be implemented in a computer-readable recording medium recording the computer program including instructions for causing the processor to perform these steps.

Meanwhile, the respective operations included in the method for changing the driver mode, performed by the steering control apparatus according to the above-described embodiment, may be implemented as a computer program including instructions for causing a processor to perform the operations.

In addition, each operation included in the method for changing the driver mode, performed by the steering control apparatus according to the above-described embodiment, may be implemented in a computer readable recording medium having a computer program storing instructions thereon, the instructions for causing a processor to perform the operations.

Combinations of individual steps of the appended flow diagrams of the present disclosure may be performed by computer program instructions. Since these computer program instructions may be provided to a processor of a general-purpose computer, a special-purpose computer, or other programmable data processing apparatus, the instructions executed through the processor of the computer or other programmable data processing apparatus generate means for implementing the functions specified in the individual steps of the flow diagrams. Since these computer program instructions may also be stored in a computer-usable or computer-readable memory that may be directed to a computer or other programmable data processing apparatus to implement a function in a particular manner, the instructions stored in the computer-usable or computer-readable memory may produce a manufacturing item including instructions that execute the functions specified in the individual steps of the flow diagrams. Since the computer program instructions may also be loaded onto a computer or other programmable data processing apparatus, by performing a series of operational steps on the computer or other programmable data processing apparatus to generate a process executed by the computer, the instructions operating the computer or other programmable data processing apparatus may also provide steps for executing the functions specified in the respective steps of the flow diagrams.

Also, each step may represent part of a module, segment, or code including one or more executable instructions for executing a specific logical function(s). Also, it is also possible that in some alternative embodiments, the specified functions are executed out of specified order. For example, it is possible that two steps shown one after another may be performed simultaneously, or the steps may be performed in reverse order depending on the corresponding functions.

The above description is merely exemplary description of the technical scope of the present disclosure, and it should be understood by those skilled in the art that various changes and modifications may be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims, and it should be appreciated that all technical scopes included within a range equivalent thereto are included in the protection scope of the present disclosure.

DETAILED DESCRIPTION OF MAIN ELEMENTS

210: SFA
215: Steering wheel
220: RWA
225: Rack
230: Steering control apparatus

What is claimed is:

1. A steering control apparatus of a steer by wire (SbW) system comprising a steer wheel feedback actuator (SFA) and a road wheel actuator (RWA), the apparatus comprising:

a transceiver configured to receive a driver mode change command, information on a rack position of the RWA, and information on a torsion bar torque of the SFA; and a processor configured to determine whether to change a driver mode based on the driver mode change command and the information on the rack position, and to control output torque for the SFA using a driver mode change signal generated based on the determined result, information on a current torsion bar torque, and information on a target torsion bar torque of a target driver mode, wherein the processor compares the driver mode indicated by the driver mode change command with a current driver mode to determine validity of the driver mode change command, and determines whether the rack position is in a driver mode changeable position based on that the driver mode change command is valid, wherein the driver mode change signal represents to change to the driver mode based on that the rack position is in the driver mode changeable position, and wherein the driver mode change signal represents to change to the driver mode based on that a product between a current rack position and a previous rack position is less than 0.

2. The steering control apparatus of claim 1, wherein, based on that the driver mode change signal represents to change to the driver mode, the processor derives a rate limit value for the target torsion bar torque, and controls a change rate of the output torque based on the rate limit value.

3. The steering control apparatus of claim 1, wherein, based on that the driver mode change signal represents to change to the driver mode, the processor resets an initial value of the target torsion bar torque.

4. The steering control apparatus of claim 3, wherein the processor resets a value of the current torsion bar torque to the initial value of the target torsion bar torque.

5. The steering control apparatus of claim 2, wherein the processor controls to limit a change rate of the output torque based on that a difference value between the target torsion bar torque and a final target torsion bar torque is greater than a threshold value, and controls the current torsion bar torque to follow the target torsion bar torque based on that the difference value between the target torsion bar torque and the final target torsion bar torque is equal to or less than the threshold value, and wherein the final target torsion bar torque is derived based on the rate limit value.

6. A method of changing a driver mode using a steering control apparatus in a steer by wire (SbW) system comprising a steer wheel feedback actuator (SFA) and a road wheel actuator (RWA), the method comprising:

receiving a driver mode change command, information on a rack position of the RWA, and information on a torsion bar torque of the SFA;

generating a driver mode change signal based on the driver mode change command and the information on the rack position; and controlling output torque for the SFA based on the driver mode change signal, information on a current torsion bar torque, and information on a target torsion bar torque of a target driver mode, wherein the generating comprises:

comparing the driver mode indicated by the driver mode change command with a current driver mode to determine validity of the driver mode change command; and determining whether the rack position is in a driver mode changeable position based on that the driver mode change command is valid, wherein the driver mode change signal represents to change to the driver mode based on that the rack position is in the driver mode changeable position, and wherein the driver mode change signal represents to change to the driver mode based on that a product between a current rack position and a previous rack position is less than 0.

7. The method of claim 6, wherein the controlling comprises:

deriving a rate limit value for the target torsion bar torque based on that the driver mode change signal represents to change to the driver mode; and controlling a change rate of the output torque based on the rate limit value.

8. The method of claim 6, wherein the controlling comprises:

resetting an initial value of the target torsion bar torque based on that the driver mode change signal represents to change to the driver mode.

9. The method of claim 8, wherein the initial value is reset to a value of the current torsion bar torque.

10. The method of claim 7, wherein the controlling comprises:

controlling to limit a change rate of the output torque based on that a difference value between the current torsion bar torque and a final target torsion bar torque is greater than a threshold value, and controlling the current torsion bar torque to follow the target torsion bar torque based on that the difference value between the target torsion bar torque and the final target torsion bar torque is equal to or less than the threshold value, and wherein the final target torsion bar torque is derived based on the rate limit value.

11. A computer program stored in a computer-readable recording medium, wherein the computer program, when executed by a processor, comprises instructions to cause the processor to perform a driver mode changing method comprising:

generating a driver mode change signal based on a driver mode change command input by a driver and information on a rack position of a steer by wire (SbW) system; and generating a control signal for controlling output torque for a steer wheel feedback actuator (SFA) of the SbW system based on the driver mode change signal, information on a current torsion bar torque of the SbW system, and information on a target torsion bar torque of a target driver mode, wherein the generating the driver mode change signal comprises:

comparing the driver mode indicated by the driver mode change command with a current driver mode to determine validity of the driver mode change command; and determining whether the rack position is in a driver mode changeable position based on that the driver mode change command is valid, wherein the driver mode change signal represents to change to the driver mode based on that the rack position is in the driver mode changeable position, and wherein the driver mode change signal represents to change to the driver mode based on that a product between a current rack position and a previous rack position is less than 0.

* * * * *